(No Model.)
C. R. DALLAS.
VALVE.
No. 604,732. Patented May 31, 1898.
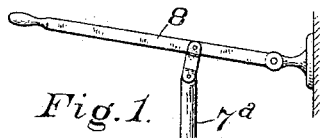
*Fig. 1.*
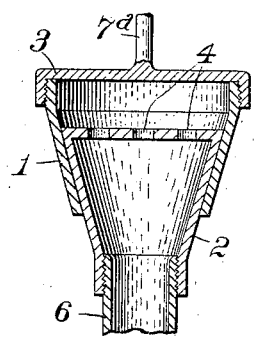
*Fig. 2.*
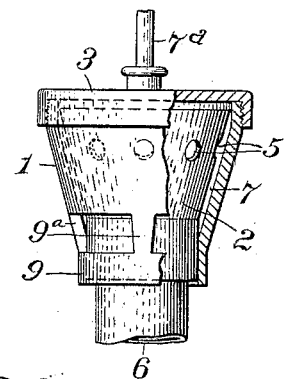
*Fig. 3.*
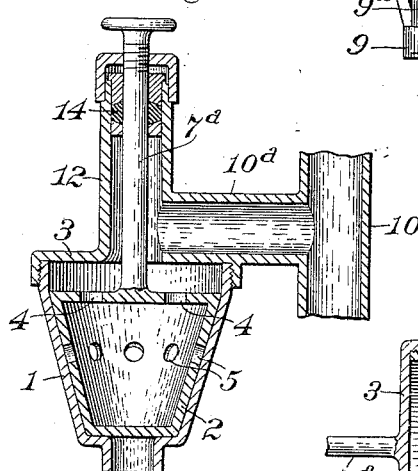
*Fig. 4.*
*Fig. 5.*
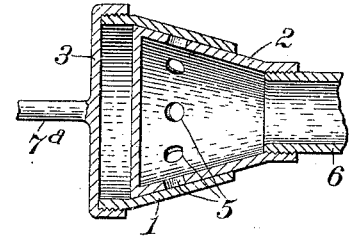
*Fig. 6.*
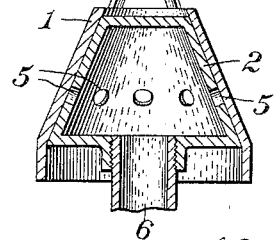
*Fig. 7.*
Witnesses
W. H. Roach
G. G. Gray
Inventor
Charles R. Dallas
By
Henry C. Evert — Attorney
THE NORRIS PETERS CO., PHOTO-LITHO., WASHINGTON, D. C.

UNITED STATES PATENT OFFICE.

CHARLES R. DALLAS, OF PITTSBURG, PENNSYLVANIA.

VALVE.

SPECIFICATION forming part of Letters Patent No. 604,732, dated May 31, 1898.

Application filed March 6, 1897. Serial No. 626,213. (No model.)

*To all whom it may concern:*

Be it known that I, CHARLES R. DALLAS, a citizen of the United States of America, residing at Pittsburg, in the county of Allegheny and State of Pennsylvania, have invented certain new and useful Improvements in Valves, of which the following is a specification, reference being had therein to the accompanying drawings.

It is my purpose to provide a novel type of valve for controlling the discharge of any fluid or gas under pressure, either constant or variable, having an extremely simple organization of such character that the volume of fluid or gas may be increased or diminished to any required extent by a comparatively limited adjustment of the movable member of the valve.

It is my purpose also to provide a valve capable of opening or closing without sliding contact at the valve-seat or closing surfaces of metal upon metal, and consequently without perceptible wear.

It is my aim also to construct a valve which shall consist of two mechanical parts only, either or both of which shall be capable of adjustment in a right line without rotation in order to open and close as well as to permit all necessary adjustment to control the volume of discharge.

It is a further object of my invention to provide a valve consisting of two parts only, each similar to the other and either one capable of adjustment without rotation in a right line coinciding or parallel with the axis of the valve, whereby an annular discharge-port is provided, the area of which may be contracted or enlarged with accuracy by a limited adjustment of the movable member of the valve.

It is my purpose also to provide a valve consisting of two parts only, either of which is capable of adjustment relatively to the other in order to open and close the valve, the two component parts being similar in form but different in size, the less being inclosed within the greater, either wholly or in part, no stuffing, packing, or grinding being required to maintain a perfectly tight close.

It is also one purpose of my invention to provide a valve having an annular or polygonal area of discharge formed by the direct adjustment of one of the parts with or without a simultaneous lateral discharge.

Finally, I aim to provide a valve so organized that it shall shut more closely as the interior pressure is augmented and in which the cushion of the fluid, gas, or steam controlled by said valve shall be formed as the valve-seat itself, its elasticity greatly facilitating the operation of the device.

My invention also comprises other features, which will be fully explained in the following specification and then more particularly pointed out in the claims.

To enable those skilled in the art to which my invention pertains to fully understand and have the benefit thereof, I will explain said invention in detail, reference being had for the purpose to the accompanying drawings, in which—

Figure 1 is a central or axial section of a valve in which my invention is incorporated. Fig. 2 is a similar section illustrating a slight modification in construction. Fig. 3 is a view, partly in side elevation and partly in vertical section, to show the construction of the valve more clearly. Figs. 4, 5, 6, and 7 are sectional views showing further modification.

The reference-numerals 1 and 2 in said drawings indicate the two parts of which my valve is composed. Each of these parts, as shown in Fig. 1 of the drawings, is substantially of the shape of a truncated hollow cone, either upright, inverted, horizontal, or arranged in any desired position. Said parts are similar in form, or substantially so, and differ in size sufficiently to enable one to be nested or seated within the other, the outer face of the inner lying against the inner face of the outer part. The large end of the outer part 1 is closed by a cap 3 or in any suitable manner. The corresponding end of the inner part 2 may be left entirely open, or it may be provided with suitable openings 4, one or more, or I may close it entirely and provide a series of openings 5 in the conical wall.

The inner part 2 of the valve usually constitutes the valve-chamber, and this part is preferably the non-adjustable or rigid part, the water or other fluid, gas, air, or steam, as the case may be, being supplied to the interior of the said rigid part 2 by a pipe 6, which enters or communicates with the truncated end.

It will be seen that by imparting a slight movement to the part 1 in a line coinciding or parallel with its axis the adjacent connecting-walls of the outer and inner parts will be separated and an annular, conical, or conoidal space 7 will be formed as a discharge-port. This space will vary in area in proportion to the distance which the part 1 moves. Considering the extent of the space thus provided for the discharge-port, it will readily be seen that its cubic contents will be largely increased or diminished by a comparatively limited range of adjustment.

By making the outer part 1 the movable member of the valve I am able to avoid the use of stuffing-boxes and packing, as well as the screw-cutting and tapping which is made necessary by such adjuncts. The opening and closing movements may be effected in various ways, but the simplest and most desirable is by the use of an ordinary valve-stem or connecting-rod $7^a$, attached centrally to the closed end of the part 1. Said stem can be operated in any manner preferred—as, for example, by a simple lever 8 of the second order or by means of a screw-threaded cut in the stem and a nut swiveled on any suitable support. I do not, however, limit my invention to any particular means for this purpose, as I may use any that are suitable, as this connection may be preferably made with a connecting-rod or a chain where the device is employed as the controlling-valve for water-tanks and the like.

The movable part of the valve may be supported by a ring 9, supported by ribs $9^a$ or in any other manner preferred, and the water or other fluid, gas, air, or steam may enter at the truncated end of the valve-chamber 2 or at the opposite end. In the latter construction it may in some cases be desirable to make the inner members movable, as seen in the modified form in Fig. 4. I have shown in this view a construction in which the outer member 1 is the rigid part of the service or supply pipe 10, having a branch $10^a$, entering a branch 12, in which is placed the valve-stem, its end being swiveled in or rigidly secured to the superior end of the inner member. The truncated end of the outer member may be prolonged and shaped to form the spout or discharge-terminal. The valve-stem will necessarily pass through a stuffing-box 14, but the accessory features may be widely varied and require no special description.

In construction like that in Fig. 1 openings may be provided in the wall closing the large end of the inner member with or without the openings in the conical wall, as already described. Usually, however, I prefer to have this end imperforate, as shown in Fig. 3. In this form of construction the imperforate head acts as a piston in the chamber formed by the surrounding walls of the outer member. The air, gas, steam, or fluid contained in said chamber forms a cushion which prevents the valve from chattering and practically maintains the movable part in proper relation to the rigid member.

The discharge may be directed vertically, horizontally, or at any angle desired, and by diminishing the angle at the vertex of the cone, and thus giving less divergence to the two parts of the valve, the volume of the discharge can be controlled with great accuracy.

My invention provides a valve of the utmost simplicity, cheapness, and efficiency. As there is no sliding contact and as it is impossible that the valve should hammer, it is practically indestructible. It is unnecessary to regrind the faces of the valve to a valve fit, the extended area of contact compensating for small inaccuracies in fit. As the direct pressure on the outer member tends to close the valve with a force proportioned to such pressure, the valve will not only close against very great pressure, but will close automatically without the use of springs or other mechanical agencies.

It will be readily understood that the two parts or members comprising the valve may converge toward the point where the water, gas, air, or steam emerge, or the convergence may be in the opposite direction, as seen in Fig. 7. The latter construction may be desirable under certain circumstances and is clearly within the purview of my invention.

What I claim is—

1. A valve composed of two hollow nested chambers, of substantially similar form, the inner member being provided with discharge-openings in the wall, a pipe connected to the truncated end of one member and a valve-stem or connecting-rod to the other, one of said members being adjustable on a line parallel to the axis of both members, substantially as shown and described.

2. A valve consisting of two similar hollow members, one nested within the other, the inner member being provided with discharge-openings in the wall, and one of said members being adjustable to form an intermediate discharge and having a form similar to that of the parts composing the valve, and a space between the top of the inner member and the outer member said space being filled with air, gas or liquid, forming a cushion to give a steady action to the valve, substantially as shown and described.

3. A valve consisting of two hollow, nested, approximately conical members, one nested in the other, a pipe opening into the truncated end of the inner member which has openings into the space between the two members, and a valve-stem upon the large end of the other member, substantially as described.

4. A valve consisting of a fixed and movable part one of which constitutes the valve-chamber, one of said parts being movable, the inner member being provided with openings, a supply-pipe connected to the contracted end of the inner part and a valve-stem or connecting-rod connected to the outer part, one of said members being adjustable on a line parallel to the axis of both members, substantially as described.

5. A valve consisting of two approximately conical hollow members, one of which is nested within the other, the inner member being provided with an imperforate head, the outer member having a chamber at one end within which the imperforate head operates, said chamber being filled with air, gas, steam or fluid and forming a cushion which rates the action of the movable member, substantially as shown and described.

In testimony whereof I affix my signature in presence of two witnesses.

CHARLES R. DALLAS.

Witnesses:
 H. C. EVERT,
 GEO. B. PARKER.